(12) United States Patent
Sceats

(10) Patent No.: US 8,632,626 B2
(45) Date of Patent: Jan. 21, 2014

(54) SYSTEM AND METHOD FOR PROCESSING FLUE GAS

(75) Inventor: Mark Geoffrey Sceats, Pyrmont (AU)

(73) Assignee: Calix Limited (AU)

( * ) Notice: Subject to any disclaimer, the term of this patent is extended or adjusted under 35 U.S.C. 154(b) by 198 days.

(21) Appl. No.: 12/992,550

(22) PCT Filed: May 15, 2009

(86) PCT No.: PCT/AU2009/000613
§ 371 (c)(1),
(2), (4) Date: Feb. 3, 2011

(87) PCT Pub. No.: WO2009/137886
PCT Pub. Date: Nov. 19, 2009

(65) Prior Publication Data
US 2011/0113957 A1    May 19, 2011

(30) Foreign Application Priority Data

May 15, 2008   (AU) ................................ 2008902392

(51) Int. Cl.
*B01D 53/02*   (2006.01)
(52) U.S. Cl.
USPC .......... 96/108; 96/112; 95/15; 95/107; 95/139
(58) Field of Classification Search
USPC ................. 96/108, 112; 95/15, 107, 108, 139
See application file for complete search history.

(56) References Cited

U.S. PATENT DOCUMENTS

| | | |
|---|---|---|
| 3,323,288 A | 6/1967 | Cheung et al. |
| 3,528,224 A | 9/1970 | Warn |
| 5,520,894 A | 5/1996 | Heesink |
| 2005/0060985 A1 | 3/2005 | Abanades Garcia et al. |
| 2006/0039853 A1 | 2/2006 | Fan |
| 2006/0093540 A1 | 5/2006 | Fan |
| 2007/0032380 A1 | 2/2007 | Anthony |
| 2007/0092427 A1 | 4/2007 | Anthony |
| 2008/0233029 A1 | 9/2008 | Fan |

FOREIGN PATENT DOCUMENTS

| | | |
|---|---|---|
| WO | WO-2006/113673 A2 | 10/2006 |
| WO | WO-2007/002792 A2 | 1/2007 |
| WO | WO-2007/002882 A2 | 1/2007 |
| WO | WO-2007/045048 A1 | 4/2007 |
| WO | WO-2007/046815 A2 | 4/2007 |

OTHER PUBLICATIONS

International Application No. PCT/AU2009/000613, International Preliminary Report on Patentability mailed Sep. 15, 2010, 8 pgs.

(Continued)

*Primary Examiner* — Christopher P Jones
(74) *Attorney, Agent, or Firm* — Schwegman Lundberg & Woessner, P.A.

(57) ABSTRACT

A system and System for removing $CO_2$ from an input gas stream. The system comprises a carboniser segment configured such that a solid sorbent reacts therein with the input gas stream to remove $CO_2$ from the input gas stream; a calciner segment configured such that the solid sorbent from the carboniser segment reacts therein to release the $CO_2$ into a substantially pure gas stream; a heat exchanger unit for exchanging heat between the carboniser and calciner segments; a first conditioning unit for controlling a $CO_2$ partial pressure in the carboniser segment; and a second conditioning unit for controlling a $CO_2$ partial pressure in the calciner segment; wherein the first and second conditioning units are configured such that a difference between the $CO_2$ partial pressures in the carboniser and calciner segments respectively is controlled such that heat is provided from the carboniser to the calciner through the heat exchanging unit.

15 Claims, 3 Drawing Sheets

(56) References Cited

OTHER PUBLICATIONS

International Application No. PCT/AU2009/000613, International Search Report mailed Jul. 22, 2009, 4 pgs.

Abanades, J. C, et al., "Capturing CO2 from combustion flue gases with a carbonation calcination loop. Experimental results in a 30kW test facility", 2nd Reunion de la Seccion Espanola del Instituto de Combustion, (May 8-9, 2008), 10 pgs.

Abanades, J. C, et al., "Fluidized bed combustion systems integrating CO2 capture with CaO", Environ Sci Technol., 39(8), (Apr. 15, 2005), 2861-6.

Gray, B. F, et al., "Thermal stabilization of chemical reactors. I The mathematical description of the Endex reactor", Proc. R. Soc. Lond. A, 455, (Jan. 8, 1999), 163-182.

Mackenzie, A., et al., "Economics of CO2 Capture Using the Calcium Cycle with a Pressurized Fluidized Bed Combustor", Energy Fuels, 21(2), (2007), 920-926.

Manovic, V., et al., "Thermal activation of CaO-based sorbent and self-reactivation during CO2 capture looping cycles", Environ Sci Technol., 42(11), (Jun. 1, 2008), 4170-4.

Shimizu, T., "A twin fluid-bed reactor for removal of CO2 from combustion processes", Trans IChemE, vol. 77, Part A, (Jan. 1999), 62-68.

European Application Serial No. 09745308.8, Supplementary European Search Report mailed Feb. 10, 2012, 8 pgs.

SYSTEM AND METHOD FOR PROCESSING FLUE GAS

PRIORITY CLAIM TO RELATED APPLICATIONS

This application is a national stage application under 35 U.S.C. §371 of PCT/AU2009/000613, filed May 15, 2009, and published as WO 2009/137886 A1 on Nov. 19, 2009, which claims priority to Australian Application No. 2008902392, filed May 15, 2008, which applications and publication are incorporated herein by reference and made a part hereof in their entirety, and the benefit of priority of each of which is claimed herein.

FIELD OF INVENTION

The present invention relates broadly to a system and method for removing $CO_2$ from an input gas stream.

BACKGROUND

There is a need for processes that can capture $CO_2$ from the flue or fuel gases generated by e.g. power stations, cement and steel factories, in order to mitigate global warming from the $CO_2$ emissions from such installations. The separation of $CO_2$ from gases produced in industrial processes, such as flue gas, is the first step in a Carbon Capture and Sequestration (CCS) process in which the $CO_2$ is separated, compressed to a high density fluid, transported and sequestered in deep saline aquifers, depleted oil and gas fields, deep coal seams, or deep ocean reservoirs.

Because of the very large investment associated with industrial infrastructure that emits $CO_2$, it is preferable that the separation process can be retrofitted to capture the flue gases emitted from such existing infrastructure, in a process called Post Combustion Capture (PCC). There are many existing chemical and physical processes for separating $CO_2$ from flue or fuel gases, but the barriers to widespread adoption of any such process are technical, economic and environmental. For power plants, a viable PCC CCS process is typically expected to meet the following specifications:—

The cost of $CO_2$ separation, including compression to the high density fluid, is less than US$20 tonne$^{-1}$; and The efficiency of capture of $CO_2$ from the flue gas exceeds 90%; and The efficiency of production of electricity (Electrical Power Output to Lower Heat Value of the Fuel) is reduced by not less than 5%; and There is no additional environmental harm.

There is currently no CCS process that can meet all of these specifications. The cost of separation is recognised to be the highest cost of all the CCS process steps. An amine based technology, called MEA, was developed for separating $CO_2$ from gases for enhanced oil and gas recovery. However, amines in general, and ammonia, produce toxic wastes, and the large environmental footprint may be such that amine and ammonia based processes may not be acceptable for large scale CCS, even if the other technoeconomic barriers to adoption can be met.

In addition to PCC, the $CO_2$ can be removed in the industrial process as a pure $CO_2$ gas stream. For example, the combustion of fossil fuels with pure oxygen leads to a gas which is essentially pure $CO_2$, for CCS. However, the cost of separating oxygen from air is an expensive process that fails to meet the specification for the cost of $CO_2$ separation. In another approach, fossil fuels are processed with steam in gasifiers to produce a fuel gas comprising hydrogen, $CO_2$ and CO, and the CO is converted to $CO_2$ by a water-gas shift reactor. The $CO_2$ is separated from the hydrogen. The amine approach can be used to scrub the $CO_2$ from these fuel gas streams, as well as other solvents such as alcohols. There are energy penalties, and environmental impacts, in the use of these scrubbing processes. Also, a CCS process for removing $CO_2$ from fuel gas streams at higher temperatures may be derived.

A promising approach for the CCS separation technology is the Calcium Regenerable Sorbent (CRS) process, which is also called CaO Looping. Heesink et al (A. B. M. Heesink and H. M. G. Temmink "Process for removing carbon dioxide regeneratively from gas streams" U.S. Pat. No. 5,520,84) first described this process in 1994 for removing $CO_2$ from flue gas and fuel gas streams. The system they describe involves a carboniser in which the sorbent, CaO or MgO.CaO, reacts with the $CO_2$ in the gas stream to produce $CaCO_3$ or MgO.$CaCO_3$. It also describes transfer of the reacted sorbent to a second reactor, the calciner, in which the $CO_2$ is released as a pure gas stream and the sorbent is regenerated and looped back into the carboniser. The energy to drive this process is applied to the calciner and is released from the carboniser through a heat exchanger where it can be used to generate energy. Shimizu et al. (T. Shimizu, T. Hirama, H. Hosoda, K. Kitano, "A twin bed reactor for removal of $CO_2$ from combustion processes", Trans I Chem E, 77A, 1999) proposed that CaO carbonation at 600° C. could be used to capture $CO_2$ from the flue gas to produce $CaCO_3$, and regeneration/calcination of CaO above 950° C. would occur by burning fuel with the $CaCO_3$, akin to conventional calcination, but with pure oxygen from a separating plant, so as to give pure $CO_2$ and steam as an output. Limestone, $CaCO_3$, is used as the feedstock.

The CRS approach has been further studied by MacKenzie et al (A. MacKenzie, D. L. Granatstein, E. J. Anthony and J. C. Abanades, "Economics of $CO_2$ Capture using the Calcium Cycle with a Pressurized Fluidized Bed Combustor" Energy Fuels 2007, 21 (2), 920-926.). They demonstrated that such a system could meet the specification for CCS set out above. However, the thermal energy needed to drive the calcination system requires that the oxyfuel plant consumes about ⅔ as much fuel as used by the power plant. In systems in which the temperature of the calciner is higher than the temperature of the carboniser, as described in the above-mentioned prior art, the loss of efficiency of the sorbent by sintering requires a higher flow of sorbent through the reactors and a higher demand for energy, and a larger plant.

Abanades Garcia et al (Abanades Garcia, J Carlos and J. Oakey; "Combustion method with integrated $CO_2$ separation by means of carbonation" US Patent publication no. 20050060985) describe a CRS process in which the thermal energy is extracted from a combustor as an additional element to the carboniser and calciner. They claim a system based on a fluid circulating fluid bed reactor, drawn bed reactor, or cyclone reactor. Their patent discloses that heat transfer from a combustion reactor provides heat to drive the calciner, and the use of a partial vacuum or steam in the operation of the calciner. They specify a calcination temperature of 900° C. and a carbonation temperature between 600-750° C., with the operating temperature of the combustor exceeding that of the calciner.

Albanades et al ("Capturing CO2 from combustive gases with a carbonation calcination loop. Experimental results in a 30 kW test facility", 2$^a$ Reunion de Seccion Espagnol del Instituto de Combustion, 8-9 May, 2008) describe a system in which the heat transfer from the combustor reactor can be facilitated by the cycling of the CaO sorbent between the combustor, calciner, and the carboniser, again in a configuration where the combustor temperature is larger than the calciner temperature, which in turn is larger than the carboniser temperature. This reduces the requirement for heat transfer through the walls of the reactors, which can be difficult to achieve in practice. However, the high temperature in the combustor leads to an additional high degree of sorbent sintering, which further reduces the efficiency of the sorbent to capture the $CO_2$.

A characteristic of the schemes referenced above is that the heat flows from the hot calciner to the cooler carboniser, and it follows that the energy burden of the CCS plant will necessarily be large, because the enthalpy of calcination is a large fraction of the heat of combustion per mole of $CO_2$. Also, as mentioned above, the efficiency of the sorbent to capture $CO_2$ is severely reduced due to sorbent sintering. The sorbent can be replenished by fresh limestone, but this introduces another energy penalty from the calcination of the limestone to the sorbent. The specifications for CCS can thus typically only be met by using the large amount of heat produced by the carboniser unit to drive turbines to produce electricity. In effect, this CRS process must typically be integrated into the power plant electricity generation system to meet the specifications, but even then the size and cost of the plant is significant. The extraction of heat from the plant combustor draws energy away that would otherwise be used to generate power, and releases heat at the lower temperature of the carbonator. Even if the heat is transformed to power, there is a decrease of the efficiency of the plant to produce power.

Limestone can be used as the feedstock in the above described prior art. The advantage of using limestone as the feedstock to produce the lime sorbent is that limestone is already used in power plants for Flue Gas Desulphurisation (FGD), and the spent sorbent from the $CO_2$ separation system can be used for FGD. Thus no additional mined limestone may be required and the waste product from FGD is gypsum, which is already accounted for in the environmental and economic impact of the power plants. Thus the CCS specification of "no additional environmental harm" with respect to the inputs and outputs of the CRS process can be met when CRS is combined with FGD. However, if the sorbent sinters and has to be refreshed by injection of fresh limestone, this advantage can be lost because the consumption of limestone for CRS exceeds the need for lime for FGD. Sorbents other than CaO can be used, such as MgO, $K_2O$ and $Na_2O$ and MgO.CaO in these metal oxide looping systems.

Thus the existing CCS systems based on CRS may satisfy the technoeconomic and environmental specifications for CCS, but are characterised by demanding a high throughput of energy to separate the $CO_2$. To meet the CCS specifications, such systems must burn significant fuel e.g. in a separate combustor from that of the power plant, or extract heat from the combustion system of that plant. This either increases the capital costs and the footprint of a CCS system or reduces the efficiency of the power plant and the CO2 produced leads to a decrease of the net CO2 avoided. This impact applies to other carbon capture technologies that rely on sorbents that have a high $CO_2$ binding energy.

A need therefore exists to provide a system and method for removing $CO_2$ from a gas stream that seek to address at least one of the above mentioned problems.

SUMMARY

It is an object of the present invention to substantially overcome, or at least ameliorate, one or more disadvantages of existing arrangements.

In accordance with a first aspect of the present invention there is provided a system for removing $CO_2$ from an input gas stream, the system comprising a carboniser segment configured such that a solid sorbent reacts therein with the input gas stream to remove $CO_2$ from the input gas stream; a calciner segment configured such that the solid sorbent from the carboniser segment reacts therein to release the $CO_2$ into a substantially pure gas stream; a heat exchanger unit for exchanging heat between the carboniser and calciner segments; a first conditioning unit for controlling a $CO_2$ partial pressure and temperature in the carboniser segment; and a second conditioning unit for controlling a $CO_2$ partial pressure and temperature in the calciner segment; wherein the first and second conditioning units are configured such that the $CO_2$ partial pressures and temperatures in the carboniser and calciner segments respectively are controlled such that the temperature in the carboniser segment is higher than the temperature in the calciner segment for providing heat from the carboniser segment to the calciner segment through the heat exchanging unit.

The first conditioning unit may comprise a the first conditioning unit comprises a pressurization element and a first heater element for controlling an input temperature of the input gas stream into the carboniser is controlled such that the carboniser segment operates at the higher temperature than the calciner segment, so that heat liberated by a sorption chemical reaction in the carboniser segment is provided to the calciner segment through the heat exchanger for consumption by a desorption chemical reaction.

The solid sorbent may comprise lime. The input gas stream may comprise a pressurized exhaust gas from a combustor.

The input gas stream may comprise a pressurized exhaust gas from a gasifier.

The combustor or the gasifier may function as at least part of the first conditioning unit.

The heat exchanging unit may comprise a thermal coupling between respective walls of the carboniser and the calciner segments.

The heat exchanging unit comprises a conveyer element for conveying sorbent at a first temperature from the carboniser segment to the celciner segment and for conveying sorbent at a second temperature lower than the first temperature from the calciner segment to the carboniser segment.

The second conditioning unit may comprise a mechanical pump.

The second conditioning unit may comprise a steam injector in the calciner and a steam condenser after the calciner exhaust.

The second conditioning unit may comprise a second heater element for controlling the temperature in the calcine segment.

The system may further comprise an expander unit coupled to a scrubbed flue gas exhaust of the carboniser segment, for decompressing the scrubbed flue gas.

The expander unit may be coupled to the second conditioning unit for providing recovered energy from the decompression to the second conditioning unit.

The expander may be coupled to a compressor train for compressing the $CO_2$.

The heat exchanging unit may comprise a gas switching mechanism such that, in a first switching configuration, the flue gas passes through a first portion of the, solid sorbent in a first section of the system functioning as the carboniser segment while a second portion of the solid sorbent is isolated from the flue gas in a second section of the system functioning as the calciner segment, and such that, in a second switching configuration, the flue gas passes through the second portion of the solid sorbent in the second section functioning as the calciner segment, while the second portion of the solid sorbent is isolated from the flue gas in the first section functioning as the carboniser segment.

In accordance with a second aspect of the present invention there is provided a method of removing $CO_2$ from an input gas stream, the method comprising the steps of reacting a solid sorbent with the input gas stream to remove $CO_2$ from the input gas stream in a carboniser; reacting the solid sorbent from the carboniser in a calciner to release the $CO_2$ into a substantially pure gas stream; exchanging heat between the carboniser and calciner; and controlling a $CO_2$ partial pressure and temperature in the carboniser and a $CO_2$ partial pressure and temperature in the calciner such that the temperature in the carboniser is higher that the temperature in the cacliner for providing heat from the carboniser to the calciner.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
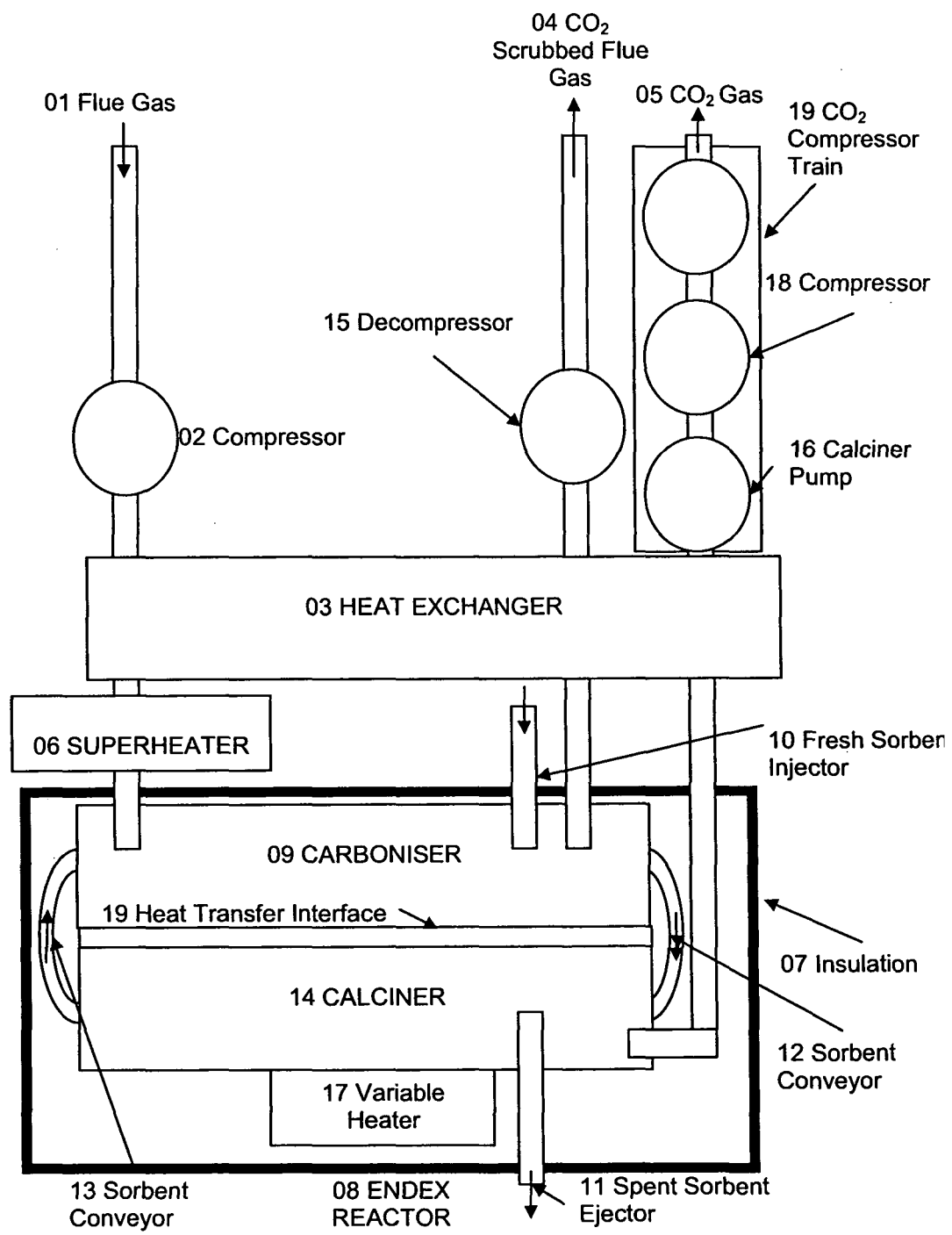
FIG. 1 shows a schematic drawing illustrating a process flow and reactor system for CRS processing according to an example embodiment.

The example system and method embodiments described for separation of carbon dioxide ($CO_2$) from a gas stream, such as a flue gas or a fuel gas, use a solid sorbent such as particles of lime. The system comprises a carboniser reactor segment with a sorbent that extracts $CO_2$ from the gas stream, a calciner reactor segment which releases the $CO_2$ into a pure gas stream and regenerates the sorbent, and means which allow heat to flow between them. The system seeks to minimise the net consumption of energy by setting the gas temperature and pressure in each segment so that the carboniser advantageously operates at a higher temperature than the calciner, and under these conditions the heat that is released in the carboniser by the sorption of $CO_2$ can be provided into the calciner and is consumed by the calciner to desorb the $CO_2$. The condition under which the energy recycling occurs is generally met in the example embodiments when the $CO_2$ pressure in the calciner exhaust is lower than that in the carboniser exhaust. Because the energy is recycled between these reactor segments, the energy demand on the separation process is advantageously lowered.

In the example embodiments, the temperatures at the exhaust of the calciner $T_{calc}$ and carboniser $T_{carb}$ is such that (a) the $CO_2$ pressure in the calciner exhaust is equal or less than the equilibrium pressure of $CO_2$, $p_{eq,CO2}(T_{calc})$, at that temperature to preferably avoid the reverse reaction of carbonation, and (b) the temperature of the carboniser exhaust is such that the $CO_2$ pressure at the exhaust is equal to/or larger than the equilibrium pressure of $CO_2$ $p_{eq,CO2}(T_{carb})$ to preferably avoid the reverse reaction of calcination. To achieve the recirculation of heat, $T_{calc}<T_{carb}$.

The carbonation temperature in a CRS process, in an example embodiment at the exhaust, is set by the desired efficiency $\zeta$ of $CO_2$ capture and the initial $CO_2$ pressure, so that $$\zeta = 1 - \frac{p_{CO2,out}}{p_{CO2,in}} < 1 - \frac{p_{eq}(T_{carb})}{p_{CO2,in}} \quad (1)$$

Operating in the regime with $T_{calc}<T_{carb}$ in the example embodiment is a deliberate departure from the existing schemes of setting the temperature of the endothermic reactor (the calciner) to be higher than that of the exothermic reactor (the carboniser). The existing schemes prefer the endothermic reaction to occur at the high temperature because heat flows from the high temperature to low temperature, under the second law of thermodynamics, all such cyclic sorption systems require the input of external energy into the higher temperature reactor and the heat is released at the colder reactor in the exothermic sorption process. In addition, the transfer of the sorbent between the reactors increases the flow of energy between the reactors, and the thermal coupling between the reactors by the sorbent flow is an energy loss in the existing schemes because the energy is not deployed in calcining the sorbent.

In stark contrast, in the example embodiments described herein, the condition $T_{calc}<T_{carb}$ is sought so that the heat is recycled. In achieving this condition, instead of being an energy loss, heat is purposely transferred, for example by either or both the sorbent flow and heat transfer through the walls of the reactors. These heat transfer mechanism are additive. In one embodiment, there is no wall heat transfer and the heat is recycled solely by the sorbent flow. It would be understood by a person skilled in the art that a requirement for efficient heat transfer through the walls of reactors containing gas-solids flows can present challenges, and impacts on the scaling of the reactors from small to large gas throughputs. In the absence of wall transfers, the size of the reactor preferably scales with the throughput by increasing the cross-section of the reactor to maintain constant gas and sorbent superficial velocities. In other embodiments, the heat transfer by sorbent flow offsets that required through the walls.

The condition that $T_{calc}<T_{carb}$ in the example embodiments has the effect that the rate of the reaction in the calciner is slower than in the conventional CRS configuration. With all other factors the same, this would mean that the residence time of the sorbent in the calciner may need to be longer than in the conventional configuration. However, the sorbent flow between the reactors in the conventional configuration always introduces an energy penalty because the energy transferred is not available for the chemical reactions. Thus, in the conventional configuration to minimise the energy penalty, the sorbent is only transferred from the carbonator when it is saturated with $CO_2$. However, the saturation level is typically approached on very long timescales (e.g. of the order of an hour see e.g [D. Todd Manobic and E. J. Anthony "Thermal activation of sorbent and self-reactivation during CO2 capture looping cycles" Environ. Sci. Technology 2008, 41, 170-4174]. In the configuration where $T_{calc}<T_{carb}$ in the example embodiments, there is advantageously no need for saturation because transfer of an incompletely reacted sorbent does not create an energy penalty. This also preferably avoids or reduces the deleterious effect of sintering that occurs during carbonation (reaction induced sintering) and the associated loss of sorption capacity, which requires either a fast replenishment of the sorbent, or a tolerance of the impact of the energy penalty from sorbent transfer, or the development of additional processes to reactivate the sorbent. Once the requirement of saturation is lifted in the example embodiments, the fast initial kinetic regime can be advantageously exploited. The long residence times in the conventional configuration further typically require that the sorbent be in the form of large stones or particles that resist entrainment in the reactor and form a fluidized bed. Attrition by rubbing of the particles in the bed can additionally cause a loss of sorbent.

Furthermore, in the conventional configuration for the calciner, with $T_{calc}>T_{carb}$, the residence time is also long because it takes time to remove the thick layer produced by saturated adsorption. That is, the necessity to saturate the sorbent in the carboniser and fully calcine the surface in the calciner consequently exposes the sorbent to long residence times in both the carboniser and the calciner. In the case of lime, this problem is exacerbated by two compounding effects. The sintering of lime is catalysed by the presence of $CO_2$, and the rate of sintering in the calciner increases with temperature.

In stark contrast, in the example embodiments, where $T_{calc}<T_{carb}$, small particles can be used in the reactors because the residence time is commensurate with the transit time of an entrained particle through a reactor with typical gas velocities—that is, there is preferably no need to use large particles that resist entrainment and there is preferably no need to achieve saturation. Thus attrition is advantageously not a problem. The use of small particles can give a reaction rate that is fast, because gas diffusion through the pore of the particle is preferably not a rate limiting step for particles less than about 200 microns diameter. There is preferably little effect of pore filling, and reaction-induced sintering, so that the irreversible loss of sorbent capacity can be greatly reduced. Because extensive pore filling preferably does not occur, the surface area of $CaCO_3$ presented by the particle when it enters the calciner is advantageously not significantly changed from that surface area of CaO presented by the particle when it is reinjected into the carboniser after calcination, and the reaction rate can be consequently fast. The low temperature and the low $CO_2$ pressure in the calciner both can reduce the impact of $CO_2$ catalysed sintering of the particle compared to the case where $T_{calc}>T_{calc}$. The inventors have recognised that the above effects can combine such that the intrinsically lower calcination rate for a given surface area when $T_{calc}<T_{carb}$ can be offset by the faster kinetics in small particles, the higher surface area in each cycle by lower pore filling, and the maintenance of that high area during multiple cycles by lower $CO_2$ catalysed and reaction induced sintering. In example embodiments, the use of smaller particles, the absence of attrition, pore filling and saturation, can allow the residence time in the carboniser to be only long enough for the deposition of less than about 100 nm of $CaCO_3$. From the understood fast initial carbonation rates, a residence time of less than about 5 seconds can be sufficient to deposit (in the carbonator) and to remove (in the calciner) layers of this thickness under the conditions of interest. The physical footprint of such a reactor system can be advantageously small because the mass loading of the sorbent can be small.

In the embodiments described herein, the conditions for the reaction are established such that $T_{calc}<T_{carb}$. In this regime, the heat is released at the higher temperature in the carboniser, and can be provided to the colder calciner if they are thermally coupled, for example by either wall and/or sorbent transfer. The thermal coupling of such reactor pairs can be described as an Endex reactor (for an endothermically stabilised exothermic process). While Endex reactors have been described theoretically by Gray and Ball (B. F. Gray and R. Ball, "Thermal Stabilisation of Chemical Reactors. I The mathematical description of the Endex reactor" Proc. R. Roc. Lond. A, 455, 163-182 (1999)"), the inventors are not aware of any application of a concept of Endex reactors to an industrial process, including removal of $CO_2$ from a gas stream described herein.

Consider a flue gas at temperature $T_{in}$ and pressure $p_{in}$ comprising neutral gases (nitrogen, steam, argon) at a flow rate $\gamma_F$ and $CO_2$ at a flow rate $\gamma_c$ with a partial pressure $p_{C,carb,in}$. To achieve the desired degree of $CO_2$ separation, $\zeta$, the control variables recognised by the inventors for the Endex reaction scheme are the flow rate of the sorbent between the reactors $\gamma_B$ and the $CO_2$ pressure at the exhaust maintained by externally pumping the system. The pumping of $CO_2$ from the reactors can be achieved for example by a mechanical pump, or by flushing the $CO_2$ from the reactor by steam and condensing the steam. The Endex reactor has a non-linear response with respect to $p_{C,calc,out}$ and the system is characterised by a stability region in which fluctuations are damped, and an instability region in which the system becomes unstable, and can switch the flow of $CO_2$ from the Calciner on or off. In the example embodiments, the desired steady state of operation is approached from the start-up of the system by a controlled process. Consider the case of a system without radiative heat losses in which the start-up condition is set by operating with a gas input initially without $CO_2$ in the gas stream, with the sorbent cycling and the calciner exhaust pump operating at the desired conditions. The temperature of the calciner and carboniser will have equilibrated at the input temperature $T_{in}$, and the sorbent will be fully calcined. To start, the composition of the gas is changed by ramping up the $CO_2$ from zero to the set value. The reactor responds by increasing the temperature of the flue gas output at the carboniser exhaust as the carbonation proceeds, and when the carbonised sorbent flows into the calciner, the temperature of the calciner falls and the $CO_2$ pressure increases as the calcination proceeds. For example the pump removes the $CO_2$. The pump capacity determines the $CO_2$ pressure in the calciner, and that $CO_2$ pressure sets the degree of calcination. The temperature changes depend, inter alia, on the magnitude of the wall heat transfer between the reactors and the sorbent transfer rates. A steady state is achieved in which $p_{C,calc,out}$ approaches the equilibrium pressure $p_{eq}(T_{calc})$. It will be appreciated that fluctuations will cause these variables to change.

The conditions for operating the Endex reactors in the desired steady state are now described for an example embodiment. The mass flow outputs of the gas from the carboniser are $(1-\zeta)\gamma_C$ and $\gamma_F$ at $T_{carb}$ and from the calciner $\zeta\gamma_C$ at $T_{calc}$, where $\zeta$ is the efficiency of $CO_2$ separation. The ideal limit is that the energy loss from the system is negligible (ie the Endex reactor is thermally insulated), in which case the input temperature is the heat-capacity weighted mean:—

$$T_{in} = \frac{[\gamma_F C_F + (1-\zeta)\gamma_C C_C]T_{carb} + \zeta\gamma_C C_C T_{calc}}{\gamma_F C_F + \gamma_C C_C} \qquad (2)$$

This relationship means that there is only one characteristic temperature of the system in the steady state, essentially $T_{carb}$-$T_{calc}$. Thus the system spontaneously generates the temperature gradient $T_{carb}$-$T_{calc}$ between the reactors.

The flow of the sorbent through the system is characterised by the uniform mass flow rate (of e.g. the pure lime sorbent) $\gamma_B$. The degree of carbonation achieved at the exit of the carbonator is $\gamma_{carb}$ and at the exit of the carboniser the residual carbonation is $\gamma_{calc}$. The mass balance gives the result that connects the degree of carbon capture efficiency $\zeta$ to the change in the degree of carbonation, by $$\frac{\zeta\gamma_C}{M_C} = \frac{(\beta_{carb}-\beta_{calc})\gamma_B}{M_B} \qquad (3)$$

where $M_B$ and $M_C$ are the molecular weights of the sorbent (e.g. lime B) and $CO_2$ (C) respectively. The sorbent flow rate can be regarded as a variable and is adjusted so that, for a given $\zeta$, the sorbent capture efficiency $\beta_{carb}$-$\beta_{calc}$ is maximised. Heat is transferred between the reactors by two means in an example embodiment, from the sorbent cycling between the reactors and through the walls that join the calciner and the carboniser. The heat transfer rate Q from the carboniser to the calciner is given by $$Q = \left[Ah + \gamma_B(B_{carb} - \beta_{calc})\left(\frac{M_A}{M_B}C_A - C_B\right)\right](T_{carb} - T_{calc}) \quad (4)$$

$$= \left[Ah + \frac{\xi M_B \gamma_C}{M_C}\left(\frac{M_A}{M_B}C_A - C_B\right)\right](T_{carb} - T_{calc})$$

where $M_A$ is the molecular weight of the fully carbonated sorbent (e.g. limestone B), $C_A$ and $C_B$ are the specific heat capacities of the limestone and lime, A is the effective surface area between the reactors and h is the effective heat transfer coefficient between the reactors.

In the carboniser, the sorbent reacts with the $CO_2$ and liberates heat, with the reaction tending to increase the temperature, while in the calciner the sorbent releases the $CO_2$ with the reaction tending to reduce the temperature. The heat liberated in the carboniser will flow to the calciner through the interface, driven by the temperature difference. That is, the Endex reactor, will commence operations from an initial condition at $T_{in}$, and will develop the temperature gradient required for stable operation.

For small particles in which gas diffusion and thermal gradients can be neglected, the rates of the reactions for CRS can be described as a reversible heterogeneous reaction in which the surface has a Langmuir-like coverage of $CO_2$. The adsorbed $CO_2$ controls the rates of both calcination and carbonation reactions.

$$k_{A/B}(T, p_c) = \frac{\left[1 - \frac{p_C}{p_{C,eq}(T)}\right]}{1 + \left[\frac{p_C}{p_{C,eq}(T)}\right]^{1/2}} k_{A/B,o}(T) S_{A/B}(\beta) \quad (5)$$

where B designates calcination and A designates carbonation, and $\beta$ is the degree of carbonation. The reaction rates for the steady state are both regulated by the respective $CO_2$ pressures, $p_{C,calc}$ and $p_{C,carb}$ through the kinetic factors $$\frac{\left[1 - \frac{p_{C,carb}}{p_{eq}(T_{carb})}\right]}{1 + \left[\frac{p_{C,carb}}{p_{eq}(T_{carb})}\right]^{1/2}} \quad (6)$$

and $$\frac{\left[1 - \frac{p_{C,calc}}{p_{eq}(T_{calc})}\right]}{1 + \left[\frac{p_{C,calc}}{p_{eq}(T_{calc})}\right]^{1/2}} \quad (7)$$

The mass of sorbent in the reactors $G_{calc}$ and $G_{carb}$ provide the scaling to balance the differences of the rate constants of calcination and carbonation, so that the relevant stable operating regime is achieved at which the operation can meet the specification for $\zeta$. The surface area, in $m^2/m^3$, is $S_A(\beta)$, being the surface area of $CaCO_3$ available for calcination, and $S_B(\beta)$ being the surface area of CaO available for carbonation. $p_C$ is the $CO_2$ partial pressure, and $p_{eq}(T)$ is the equilibrium partial pressure given by $$p_{C,eq}(T) = \exp\left[-\frac{\Delta H}{R}\left(\frac{1}{T} - \frac{1}{T_0}\right)\right] \quad (8)$$

where the pressure is in bar and $T_o$ is the equilibrium temperature at 1 bar pressure $$T_0 = \frac{\Delta H}{\Delta S} \quad (9)$$

where $\Delta H$ is the standard enthalpy of the reaction and $\Delta S$ is the standard entropy of the reaction. For CRS, $\Delta H=178$ kJ $mol^{-1}$ and $T_o=895$ C. Numerically, $$p_{C,eq}(T) = 4.1371 0^7 \exp\left\{-\frac{20474}{T}\right\} \quad (10)$$

The rate constant $k_{A/B}$ in m $s^{-1}$ is given by $$k_{A/Bo}(T) = k_o \exp\left[-\frac{E}{RT}\right] \quad (11)$$

where $E_A$ is the activation energy for the reaction. For lime, $k_o=155$ m $s^{-1}$ and $E_A=205$ kJ $mol^{-1}$. Numerically, $$k_{A/Bo}(T) = 155 \exp\left(-\frac{24690}{T}\right) ms^{-1} \quad (12)$$

The surface areas depend on many factors, including the thermal history of the particles, and the degree of carbonation $\beta$. An approximation, for illustration purposes, is to neglect the effects of pore filling/emptying and sintering $$S_{A/B}=S_o \quad (13)$$

where $S_o$ is the surface area of the fully calcined sorbent with $S_o=1.5 \cdot 10^8 m^2 m^{-3}$ (21 $m^2$ $gm^{-1}$) for an example embodiment. It is noted that the actual evolution of the texture of lime during calcination, carbonation and sintering is more complex than this simple model, with the surface area being catalytically sintered by $CO_2$ and steam.

Calcination proceeds when $p_C<p_{eq}(T)$ when $k_A(T_{calc}, p_c)>0$, whereas carbonation proceeds, when $k_B(T_{carb},p_c)<0$ when $p_C>p_{eq}(T)$. The ½ power law in the denominator of the rate constant $k_{A/B}(T,p_C)$ (equation 1), when applied to calcination and carbonation, is based on an analysis of the known saturation effect of $CO_2$, which is physically adsorbed onto the surface of the reaction zone and which inhibits both calcination and carbonation, and arises because one adsorbed $CO_2$ molecule occupies 2 oxide sites on the reaction surface. This formulation agrees well with the literature on limestone calcination and lime carbonation. The reaction rates that arise from this formulation are consistent with the initial reactions proceeding on the timescale of seconds. This timescale impacts on the designs of the reactor systems. In the prior art for the CRS process, the reactors described are generally fluidized beds, and this arises because of the need to achieve saturated carbonation on the timescale of hours. In these beds, the flue gas friction is not sufficient to entrain the particles, so the residence time can be controlled. However, where timescales of the reactions occurs in seconds, entrainment of the particles by the flue gas is viable because, with gas velocities in the range of 5-30 m $s^{-1}$, the height of an entrained flow reactor is in the range of 5-30 m. Sceats and Horley (PCT/AU2006/001558) describe CRS systems in which such entrained flow reactors are used. This patent demonstrates that the sintering of the sorbent is reduced, so that the particles maintain their reactivity. Entrained flow reactors have a small footprint with low mass loadings, compared to fluidized bed reactors. The embodiments in the figures presented are entrained flow reactors, and the described example embodiments set out the requirements for heat transfer in such entrained flow reactors.

The detailed description of an example embodiment configuration above shows that the heat transfer is promoted by both the wall heat transfer rate and the sorbent transfer. The implementation of multiphase solids reactors that rely on wall heat transfer can have a drawback associated with the scaling of the reactor with increasing the flue gas injection rate $\gamma_F+\gamma_C$. That is, as the area A for the wall transfer needs to also increase and the heat transfer coefficient h needs to be maintained, and this leads to a high cost. Thus, it is preferable that the reactor has a small contribution from the wall heat transfer, and this can be achieved for example by relying solely on the sorbent transfer contribution. In this case, the system scales with flue gas input by scaling the reactor cross section linearly with the reactor cross-section so that the flux is constant (in kg m$^{-2}$ s$^{-1}$). In this limit, the gas and solids act as the heat reservoirs as the particles flow through the reactor. The heat of reaction is sufficiently high that only a small degree of carbonation can be tolerated, to about 2-3%, such that the temperature change $T_{calc}$-$T_{carb}$ can fall in a desirable range of <50 C in example embodiments.

In such an embodiment, for an input gas pressure of 14 bar, there is a very large sorbent flux through the reactors, of the order 50 kg s$^{-1}$ for a flue gas input of about 4.5 kg s$^{-1}$ to extract 1.0 kg s$^{-1}$ of $CO_2$. With this mass loading, the flue gas has the ability to accelerate the particles of for example about 125 microns diameter through the carboniser when it has a diameter of about 0.25 m, which acts as Riser reactor with a pressure drop of about 0.3 bar in 14 bar. The pressure drop causes an energy penalty in the ability of the compressed gas to generate energy through a turboexpander. In this embodiment, about 90% of the $CO_2$ is captured in the transport through the reactor which is about 12 m high by a change in the sorbent carbonation of only about 2-3%. In this embodiment, the particles are fully calcined as they fall through a calciner reactor of about 2 m in diameter which is pumped to maintain the $CO_2$ pressure below about 0.08 bar.

FIG. 1 shows a schematic drawing illustrating a system and flow process according to an example embodiment. With reference to FIG. 1, the separation process using the Endex reactor according to an example embodiment will now be described. The flue or fuel gas stream 01 is injected from a power plant or other industrial process at, for example about 1.03 bar and about 80-200° C., and are compressed in the compressor 02 to the desired pressure, e.g. in the range of about 4-20 bar depending on the $CO_2$ load. The compression is preferably carried out adiabatically so that the flue gas temperature is raised towards the desired injection temperature $T_{in}$ (e.g. about 800° C.). The flue gas stream enters a heat exchanger 03 in which heat is extracted from the scrubbed flue gas 04 as well as from the pure $CO_2$ gas stream 05. The thermal efficiencies of the heat exchanger 03 in the example embodiment are such that make-up heat is provided in a superheater 06 to give the desired $T_{in}$. The Endex reactor 08 is thermally insulated 07. The flue gas temperature $T_{in}$ and pressure at the injection point into the carboniser section 09 of the Endex reactor 08 are set by the compressor/heat exchanger/superheater so that the desired $CO_2$ partial pressure, $p_{C,carb}$, and the temperature $T_{carb}$ are maintained at the exhaust of the carboniser segment 09. The other input into the Endex reactor 08 is an injector 10 for fresh sorbent. This fresh sorbent is preferably a powder of lime having been prepared with a high surface area and mesoporosity. This sorbent replaces a portion of the sorbent which has lost its reactivity, and which is ejected from the Endex reactor 08 at the ejector 11. The ejected sorbent will have a residual reactivity, and can advantageously be used for a FGD process, understood in the art to remove sulphur from the flue gas. The sorbent is preferably pneumatically conveyed by conveyor systems 12 and 13 at the desired rates between the carboniser 09 and the calciner 14 segments of the Endex reactor 08.

The exhaust gas from carboniser segment 09 is the pressurised scrubbed flue gas at temperature $T_{carb}$. This gas passes through the heat exchanger 03 and then a decompressor 15 for release to atmosphere. The decompressor 15 is mechanically linked to a pump 16 that evacuates the calciner segment 14 of the Endex reactor 08. This pump 16 regulates the $CO_2$ pressure in the calciner segment, $P_{C,calc}$ so that $P_{C,calc}=p_{C,eq}(T_{calc})$. It is preferable that the temperature $T_{calc}$ in the calciner segment 14 is achieved by the balance of the heat and mass flows, and the chemical reactions, in the Endex reactor 08. However, a variable heater 17 is provided so that the Endex reactor 08 can be optimised. It is anticipated that, in steady state, this heater would be turned off. The high activation energy and enthalpy of the chemical reaction of the sorbent with the $CO_2$ is such that small temperature changes can have a significant effect on the reaction rate, through the exponential dependence of the chemical rate constant $k_{calc}(T)$ and the $CO_2$ equilibrium pressure $p_{C,eq}(T)$ on temperature.

The energy required to drive the pump 16 is a small fraction of the energy released in the expander 15, and the excess mechanical energy is used to compress the $CO_2$ in a compressor stage 18 of the compressor train 19. For CCS applications, the $CO_2$ gas is typically pressurised to pressures between above 50 to 100 bar, and this is done through the compressor train 19. In this system, the pump 16 and the compressor 18 are the first two stages of this train 19. Thus, in the example embodiment these two stages are powered indirectly by the compressor 02 through the release of energy in the expander 15. The energy efficiency of the compressor train 19 is preferably optimised so that the energy consumption required to deliver the specified $CO_2$ pressure.

The dimensions of the carboniser 09 and calciner 14 reactor segments are chosen in the example embodiment to provide the appropriate residence times for the gases so that the reactions achieve the desired capture efficiency. In the example embodiment, the heat transfers within the reactor depend on the particle-gas, gas-wall and particle-wall heat transfer rates in each reactor 09, 14, and the heat transfers between the two reactors 09, 14 depends on the interface heat exchanger 19 properties. Each of the calciner and carboniser reactors 09, 14 is a multiphase reactor (gas and solids), and can be a fluidized bed, a circulating fluidized bed or an entrained flow reactor so that the heat transfer rates within each reactor 09, 14 are sufficiently fast to give rise to a preferably constant temperature within each reactor 09, 14.

The reactors 09, 14 preferably use the density differences between the gas and the solid particles, the friction between them and with the walls, and gravitational forces to achieve the desired conditions for the reaction. The sorbent flow rate and the reactor volumes determine the solids fill factor of the reactor, and this causes a pressure drop through the reactor. In one embodiment, one or more of these reactors may operate in a single pass configuration in which the reaction proceeds as the particles flow through the reactor. The interface 19 between the reactor segments advantageously has a sufficient surface area and thickness, and effective heat transfer to the respective particles, so that the heat can be transferred at the relevant rate for a relevant temperate gradient to meet the Endex reactor specification. In one embodiment, the reactor segments comprise an array of pipes as in a heat exchanger in which one reaction segment is the region within the pipes and the other reaction segment is the region between the pipes.

In another embodiment, the flue gas is obtained directly from a pressurised fluid bed combustor at the desired $p_{in}$ and $T_{in}$. In this embodiment, the system operates by compressing air for the combustion process rather than compressing the flue gas as described above. In this embodiment, the Endex reactor system 08 described would be placed between the combustor and the turboexpander which forms part of a pressurised fluid bed combustor used to generate electrical power. The Endex reactors described above may be considered to be an element of an ensemble of N such reactors, in which the gas stream moves between a number of the reactors, in series and parallel, so that the specified $CO_2$ separation $\zeta$ is achieved by the passage of the gas through such an array. In such a system, the sorbent may also be routed through the array so that the fresh sorbent is introduced at a point where its high sorption capacity optimises the systems performance. The advantages of such a system include that the sorbent that is ultimately ejected from the system is uniformly degraded (not being mixed with the fresh sorbent With reference to FIG. 2, in one embodiment, the design specification for the Endex reactor is to achieve a 90% separation of the $CO_2$ from the flue gas. The nominal operating conditions to achieve this specification is that the flue gas should be about 817 C and the $CO_2$ input pressure should be at least 2.20 bar and the $CO_2$ output pressure should be about 0.08 bar.

Figure 2:
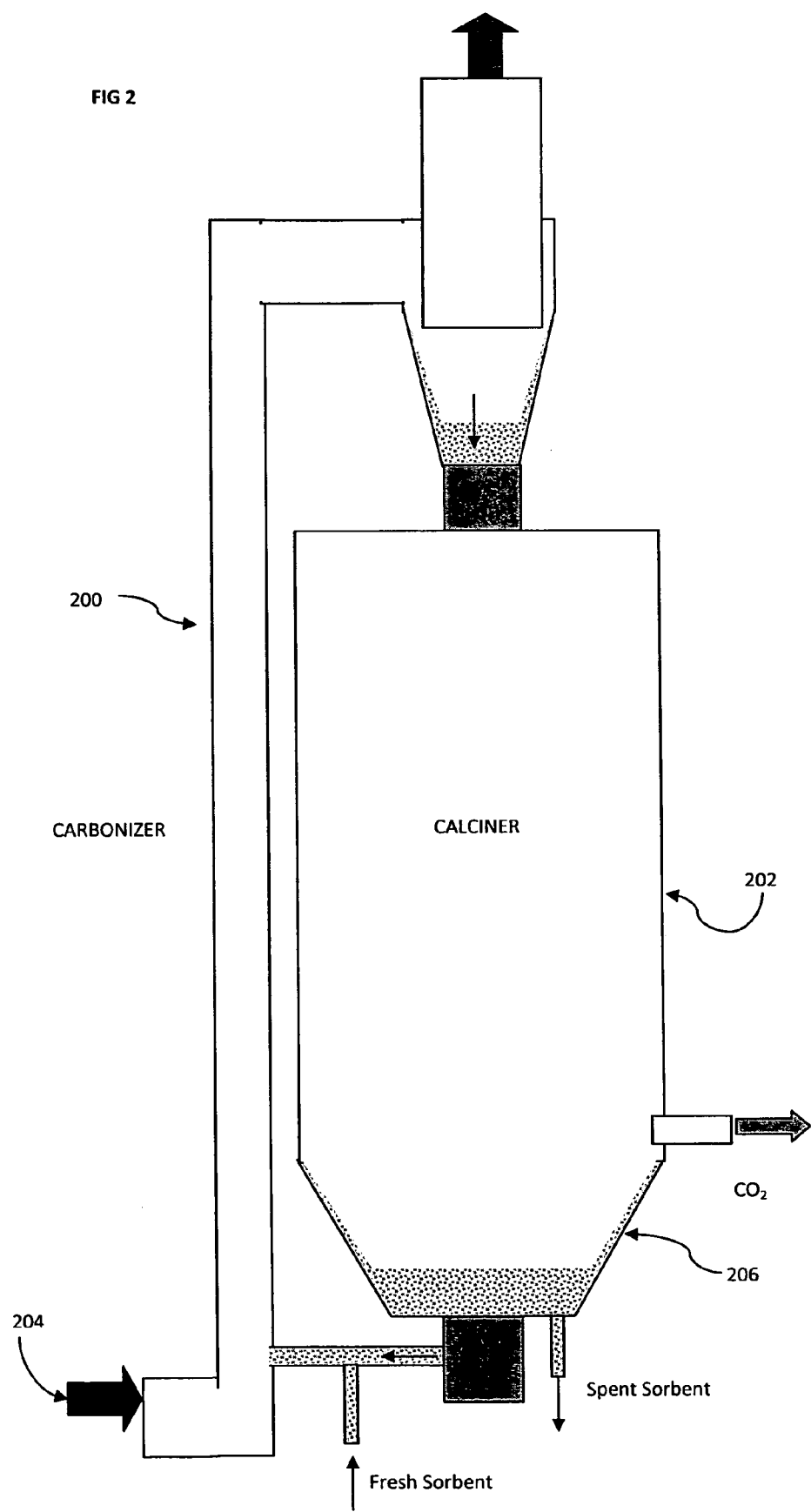
FIG. 2 shows a schematic drawing illustrating a reactor for CRS processing according to an example embodiment.

In the Endex reactor embodiment schematically shown in FIG. 2, the sorbent is cycled between two reactor pipes, the Carboniser 200 and the Calciner 202, with the heat transfer between the reactors 200, 202 occurring in this embodiment only by sorbent transfer. That is, wall heat transfer between the reactors 200, 202 is not deployed. The energy loss is taken to be about 5% of the heat transferred between the reactors 200, 202 by sorbent transfer in this embodiment.

The Carboniser 200 is configured as a RISER reactor to take advantage of the ability of the flue gas 204 to lift the sorbent particles through the reactor 200, and the Calciner 202 is configured as a DOWNER reactor to take advantage of the gravitational force to accelerate the particles down to the base 206.

The Carboniser 200 is a high pressure reactor built to hold the pressure of about 13-15 bar at 817 C to achieve the desired $CO_2$ partial pressure of 2.20 bar from flue and fuel gas streams, while the Calciner 202 is a low pressure reactor designed to maintain a $CO_2$ pressure of less than about 0.08 bar.

The gas particle separation in each reactor 200, 202 and the sorbent transfer mechanisms of the sorbent between the high and low pressure reactors 200, 202 at these high temperatures are preferably accomplished with a minimal loss of heat and minimal leakage of gases into the Calciner 202.

In order to minimise the effect of sintering, it is beneficial to minimise the residence time of the particles in hoppers during the transfer. The energy required to accelerate the particles from the base of the Carbonator to the throat of the Calciner, which causes a pressure drop in the flue gas which is about 0.33 bar, the mechanical energy to exhaust the $CO_2$ from the Calciner to maintain the condition that the $CO_2$ pressure is less than the equilibrium pressure at the exhaust of the Calciner, which is supplied by a turbofan system operating isothermally in an example embodiment. The mechanical energy to transfer the particles between the reactors through feed screws etc. are provided to drive the Endex reactor embodiment.

The energy losses associated with the pressure drop, the turbofan drive and the radiative heat losses from the reactors surfaces are all relatively small energies in the context of the underlying application, so the efficiency of the Endex configuration can intrinsically be very high. In the Endex configuration, there is preferably no need to supply external energy, or extract heat from the materials in the reactor. The outer casing of the reactors can be thermally insulated by lagging to minimise the radiative heat loss.

In an example embodiment the following dimensions may be implemented:
Carboniser 200 Height 12 m, Radius 0.25 m
Calciner 202 Height 12 m, Radius 2.0 m Because the sorbent particles are entrained in the gas, the height is determined in the example embodiment by the gas and sorbent velocity and set so that there is a sufficient residence time of the gas and particles in the system (e.g. about 1.0 s for the Carboniser 200 and about 1.8 s for the Calciner 202). The diameter of the Carboniser 200 is based on generating sufficient gas velocity to lift the particles through the Carboniser 200 substantially without choking. The diameter of the Calciner 202 is set by the requirement that the $CO_2$ gas velocity is sufficiently low at the exhaust that the entrained particles reside in the calciner for a sufficiently time for the Calcination reaction to occur.

The absence of wall heat transfer in this example embodiment has the consequence is that the sorbent load is higher than it would be with heat transfer.

However, such an Endex reactor embodiment scales linearly with the cross-sectional area of the reactor cylinders from about 5 $MW_e$ to about 500 $MW_e$. This embodiment can thus provide for a "smooth" scaling of the reactor system with flue gas input because the height would advantageously not be changed.

Figure 3:
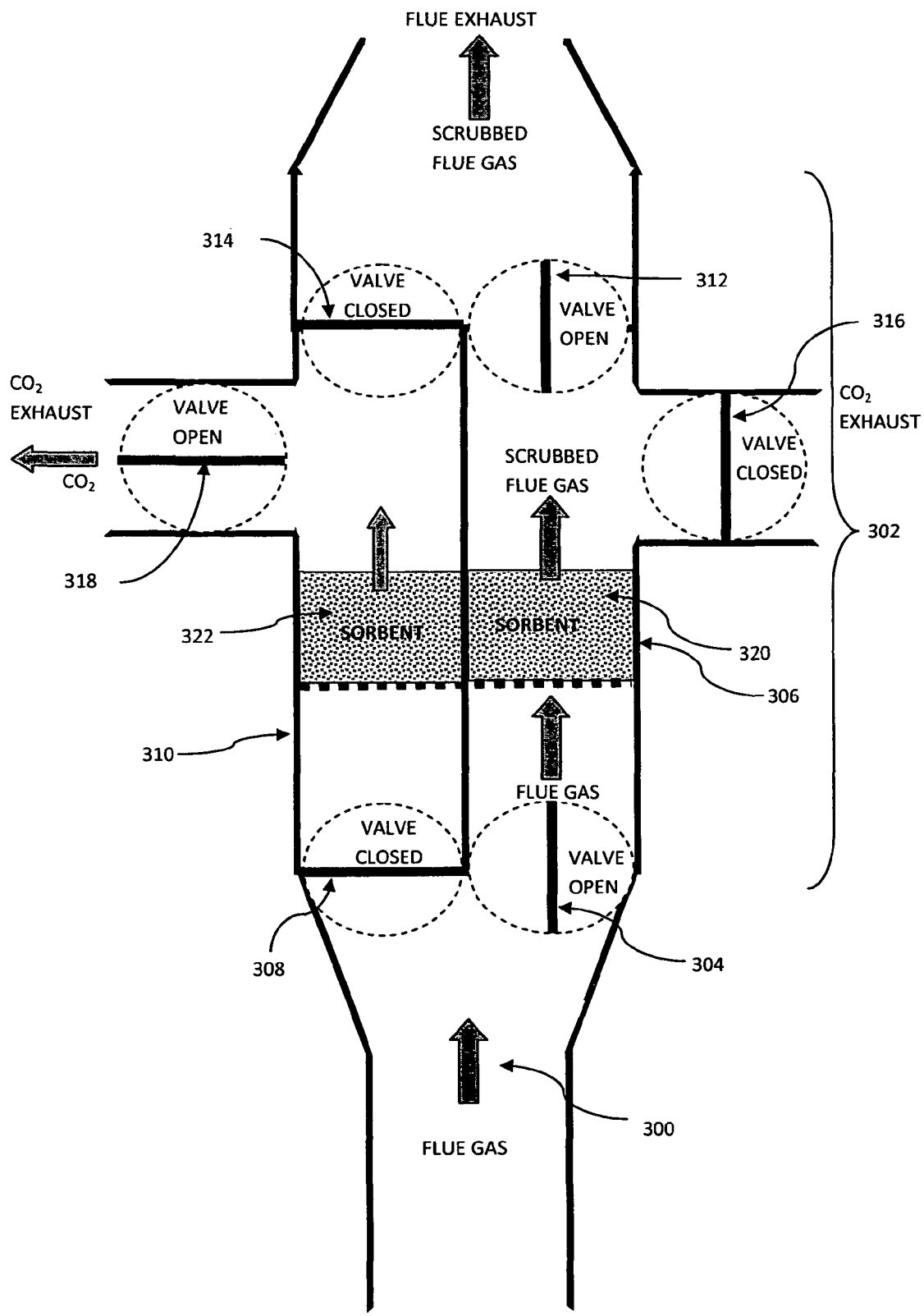
FIG. 3 shows a schematic drawing illustrating a reactor for CRS processing according to an example embodiment.

FIG. 3 is a schematic drawing showing another Endex reactor embodiment, more particular an embodiment based on gas switching. In this example embodiment, a flue gas input stream 300 is provided at an entrance of the Endex reactor 302. In a first switching configuration, an entry valve 304 into a first section 306 of the Endex reactor 302 is in an open position, whereas an entry valve 308 into a second portion 310 of the Endex reactor 302 is in a closed position. Similarly, an exit valve 312 of the first portion 306 is in an open position, while an exit valve 314 of the second portion 310 is in a closed position.

Additionally, a $CO_2$ exhaust valve 316 of the first portion 306 is in a closed position, while a $CO_2$ exhaust valve 318 of the second section 310 is in an open position.

In this switching configuration, the first portion 306 functions as a carboniser for a first portion of the sorbent 320 disposed in the first section 306 of the Endex reactor 302, while the second portion 310 functions as a calciner for a second absorbent portion 322 disposed inside the second portion 310 of the Endex reactor 302. The sorbent 320 and 322 in this embodiment may preferably be a fluidized bed.

It will be appreciated by a person skilled in the art that by periodically changing the switching configuration to reverse all of the valve positions in FIG. 3, the first and second portions 306, 310 of the Endex reactor 302 can function as either a carboniser or a calciner for the respective first and second sorbent portions 320, 322. It will be appreciated that in this embodiment, the heat exchange between the carboniser and the calciner can be optimised, in as much as no physical transfer of the sorbent is required "between" the carboniser and the calciner. In this embodiment, elements used for controlling the $CO_2$ partial pressures in the first and second sections 306, 310 have been omitted, but it will be appreciated that they can be implemented for example in a similar manner as described above with reference to FIGS. 1 and 2.

It will be appreciated that the sorbent portions 320, 322 can be provided in different forms, including for example in a fluidized bed configuration.

In the example embodiments described, efficient separation of $CO_2$ from a flue gas stream is accomplished using the calcium regenerable sorption process in which the energy consumption for separation is minimised by setting the input temperature and pressures, and the pressure of the separated $CO_2$ gas stream, such that the endothermic reaction associated with sorption in the carboniser system operates at a higher temperature than the exothermic calciner system, so that the heat released in the carboniser is provided to the calciner, where it is consumed in the calcination reaction. The cyclic process can reduce the demand for external energy to achieve the gas separation.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A system for removing $CO_2$ from an input gas stream, the system comprising:
   a carboniser segment configured such that a solid sorbent reacts therein with the input gas stream to remove $CO_2$ from the input gas stream;
   a calciner segment configured such that the solid sorbent from the carboniser segment reacts therein to release the $CO_2$ into a substantially pure gas stream;
   a heat exchanger unit for exchanging heat between the carboniser and calciner segments;
   a first conditioning unit for controlling a $CO_2$ partial pressure and temperature in the carboniser segment; and
   a second conditioning unit for controlling a $CO_2$ partial pressure and temperature in the calciner segment;
   wherein the first conditioning unit comprises a pressurization element and a first heater for controlling an input temperature of the input gas stream into the carboniser configured such that the carboniser segment operates at the higher temperature than the calciner segment, so that heat liberated by a sorption chemical reaction in the carboniser segment is provided to the calciner segment through the heat exchanger for consumption by a desorption chemical reaction.

2. The system as claimed in claim 1, wherein the solid sorbent comprises lime.

3. The system as claimed in claim 1, wherein the input gas stream comprises a pressurized exhaust gas from a combustor.

4. The system as claimed in claim 3, wherein the combustor functions as at least part of the first conditioning unit.

5. The system as claimed in claim 1, wherein the input gas stream comprises a pressurized exhaust gas from a gasifier.

6. The system as claimed in claim 5, wherein the gasifier functions as at least part of the first conditioning unit.

7. The system as claimed in claim 1, wherein the heat exchanging unit comprises a thermal coupling between respective walls of the carboniser and the calciner segments.

8. The system as claimed in claim 1, wherein the heat exchanging unit comprises a conveyer element for conveying sorbent at a first temperature from the carboniser segment to the calciner segment and for conveying sorbent at a second temperature lower than the first temperature from the calciner segment to the carboniser segment.

9. The system as claimed in claim 1, wherein the second conditioning unit comprises a mechanical pump.

10. The system as claimed in claim 1, wherein the second conditioning unit comprises a steam injector in the calciner and a steam condenser after the calciner exhaust.

11. The system as claimed in claim 1, wherein the second conditioning unit comprises a second heater for controlling the temperature in the calciner segment.

12. The system as claimed in claim 1, further comprising an expander unit coupled to a scrubbed flue gas exhaust of the carboniser segment, for decompressing the scrubbed flue gas.

13. The system as claimed in claim 12, wherein the expander unit is coupled to the second conditioning unit for providing recovered energy from the decompression to the second conditioning unit.

14. The system as claimed in claim 12, further wherein the expander is coupled to a compressor train for compressing the $CO_2$.

15. The system as claimed in claim 1, wherein the heat exchanging unit comprises a gas switching mechanism such that, in a first switching configuration, the flue gas passes through a first portion of the solid sorbent in a first section of the system functioning as the carboniser segment while a second portion of the solid sorbent is isolated from the flue gas in a second section of the system functioning as the calciner segment, and such that, in a second switching configuration, the flue gas passes through the second portion of the solid sorbent in the second section functioning as the calciner segment, while the second portion of the solid sorbent is isolated from the flue gas in the first section functioning as the carboniser segment.

* * * * *